United States Patent [19]

Beverly et al.

[11] Patent Number: 5,576,942

[45] Date of Patent: Nov. 19, 1996

[54] METHOD AND APPARATUS FOR REDUCING THE HARMONIC CURRENTS IN ALTERNATING-CURRENT DISTRIBUTION NETWORKS

[75] Inventors: Leon H. Beverly, Lockport; Richard D. Hance, Elburn; Alexandr L. Kristalinski, Naperville; Age T. Visser, Geneva, all of Ill.

[73] Assignee: Universities Research Association, Inc., Washington, D.C.

[21] Appl. No.: 316,634

[22] Filed: Sep. 30, 1994

[51] Int. Cl.$^6$ ........................................... H02J 1/02
[52] U.S. Cl. ................................. 363/39; 323/215
[58] Field of Search ......................... 323/215; 363/39, 363/40, 45, 152, 153

[56] References Cited

U.S. PATENT DOCUMENTS

| | | | |
|---|---|---|---|
| 3,128,438 | 4/1964 | Suda | 331/75 |
| 4,209,757 | 6/1980 | Becker | 333/17 R |
| 4,355,241 | 10/1982 | Hingorani | 307/102 |
| 4,493,016 | 1/1985 | Cham et al. | 363/126 |
| 4,525,764 | 6/1985 | Titus | 361/42 |
| 4,531,085 | 7/1985 | Mesenhimer | 323/214 |
| 4,622,474 | 11/1986 | Christi et al. | 307/105 |
| 4,684,875 | 8/1987 | Powell | 323/204 |
| 4,847,745 | 7/1989 | Shekhawat et al. | 363/132 |
| 4,870,557 | 9/1989 | Stacey | 363/43 |
| 5,235,503 | 8/1993 | Stemmler et al. | 363/37 |
| 5,446,643 | 8/1995 | McMurray | 363/40 |

OTHER PUBLICATIONS

"Design and Performance of Harmonic Filters", *Power Quality*, Gross, 1990.
"Coping With Phase-To-Phase Nonlinear Loads And Harmonics", *EC&M*, DeDad, Jun. 1991.
"Line Current Harmonics Effects On Transformers", Teledyne Crittenden, Gardena, CA, Lee, Jul. 18, 1991.
"Eliminating Harmonic Currents Using Transformers", *Power Quality*, Lee, Sep. 1991.
"Improving Power Factor in the Presence of Harmonics Using Low-Voltage Tuned Filters", *IEEE Transaction On Industry Applications*, vol. 29, No. 3, Lowenstein, May, 1993.

*Primary Examiner*—Matthew V. Nguyen
*Attorney, Agent, or Firm*—McAndrews, Held & Malloy, Ltd.

[57] ABSTRACT

An improved apparatus and method reduce the harmonic content of AC line and neutral line currents in polyphase AC source distribution networks. The apparatus and method employ a polyphase Zig-Zag transformer connected between the AC source distribution network and a load. The apparatus and method also employs a mechanism for increasing the source neutral impedance of the AC source distribution network. This mechanism can consist of a choke installed in the neutral line between the AC source and the Zig-Zag transformer.

4 Claims, 12 Drawing Sheets

FIG. 6
CURRENT: 19.7-19.9 A RMS

FIG. 7
CURRENT: 3.4-3.4 A RMS

FIG. 8
CURRENT: 22.1–22.4 A RMS

FIG. 9
CURRENT: 20.8–21.2 A RMS

FIG. 10
CURRENT: 15.5-15.7 A RMS

FIG. 11
CURRENT: 12.9-13.1 A RMS

FIG. 16
CURRENT: 6.7-6.9 A RMS

FIG. 17
CURRENT: 7.8-7.9 A RMS

FIG. 20
CURRENT: 16.8-17.0 A RMS

FIG. 21
CURRENT: 13.9-14.4 A RMS

METHOD AND APPARATUS FOR REDUCING THE HARMONIC CURRENTS IN ALTERNATING-CURRENT DISTRIBUTION NETWORKS

This invention was made with Government support under Contract No. DE-AC02-76CH03000, awarded by the United States Department of Energy. The Government has certain rights in the invention.

FIELD OF THE INVENTION

The present invention relates to reducing harmonic currents in electrical networks. More particularly, the present invention relates to an apparatus which includes a polyphase Zig-Zag autotransformer ("Zig-Zag transformer") connected in parallel with a load, wherein the Zig-Zag transformer includes a choke (inductor) installed in the neutral line.

BACKGROUND OF THE INVENTION

This invention relates to a technique for reducing the harmonic currents in alternating-current (AC) distribution networks through the use of polyphase Zig-Zag autotransformers ("Zig-Zag transformers") with a choke (inductor) installed in the neutral line.

A common problem in power distribution networks includes AC line currents having high harmonic content and hence the potential for overloaded neutral wires caused by the non-linear loading of electronic power supplies. Different solutions have been offered for this problem. Some examples include specially designed K-rated AC distribution transformers, delta connected primary windings, and L-C (inductor-capacitor) tuned filters.

All of the above methods have some limitations. For instance, a K-rated transformer does not eliminate harmonics, and may transmit them into the feeder. Neutral currents that flow from various loads to the K-rated transformer might still be very high. Often, these K-rated transformers are more expensive and are larger in physical size than conventional transformers.

The delta connected primary of a power distribution transformer can only eliminate triplen harmonics (zero-sequence currents) for balanced loads. Additionally, neutral currents caused by the loads are usually not eliminated. The primary side circuit breaker might also not protect a transformer against overcurrents because the circuit breaker may not sense the triplen harmonic current that is circulating in the primary of the transformer.

L-C filters can often create undesirable resonances, which can lead to an increase in harmonic currents, thus intensifying the overall problem.

Another solution includes the use of Zig-Zag transformers installed in the distribution network. Zig-Zag transformers have previously been used to reduce harmonics and eliminate neutral currents by transferring harmonic currents between the phases of a three-phase system. See Robert H. Lee, *Eliminating Harmonic Currents Using Transformers*, Power Quality, September/October 1991, at 33.

However, large neutral currents often return back into the distribution network and are not properly eliminated by the Zig-Zag transformer due to the low source neutral impedance as compared to the relatively high Zig-Zag transformer impedance. These large returning neutral currents can impede the ability of the Zig-Zag transformer to perform, for example, the following functions: (1) the localization of the neutral currents, (2) the elimination of triplen harmonics (zero-sequence currents) from the phase currents, and (3) the balancing of the phase currents. This can additionally lead to overheating of distribution transformers and secondary distribution wires.

It is therefore an object of the present invention to reduce the harmonic content of AC line currents in power distribution networks through the use of Zig-Zag transformers with a strategically-placed choke installed in the neutral line.

SUMMARY OF THE INVENTION

The strategically-placed choke on the neutral line increases the impedance of the source neutral thus making it harder for the neutral current to return via the distribution transformer. This choke also allows the present invention to steer the local harmonics into the Zig-Zag transformer for redistribution and to prohibit harmonic currents generated elsewhere from entering the Zig-Zag transformer.

This solution is attractive for the following reasons: relatively low cost, simplicity, ease of installation on existing distribution systems, the ability to keep neutral currents local thus eliminating the need for larger neutral wires, and the ability to improve the fundamental load current balance.

The foregoing and other objects are achieved by an apparatus comprising a Zig-Zag transformer connected between the AC source distribution network and a load, wherein a choke is connected in the neutral line between the AC source and the Zig-Zag transformer.

The foregoing and other objects are also achieved by an apparatus comprising a Zig-Zag transformer connected between an AC source distribution network and a load, wherein the apparatus includes mechanism for increasing the source neutral impedance of the AC distribution network relative to the Zig-Zag transformer which is connected in parallel with the load.

The foregoing and other objects are also achieved by a method comprising the steps of connecting a Zig-Zag transformer between an AC source distribution network and a load, and connecting a choke in the transformer neutral line between the AC source and the Zig-Zag transformer.

The foregoing and other objects are also achieved by a method comprising the steps of connecting a Zig-Zag transformer between an AC source distribution network and a load, and using mechanism for increasing the source neutral impedance of the AC distribution network relative to the Zig-Zag transformer which is connected in parallel with the load.

DETAILED DESCRIPTION OF THE PREFERRED EMBODIMENTS

Figure 1:
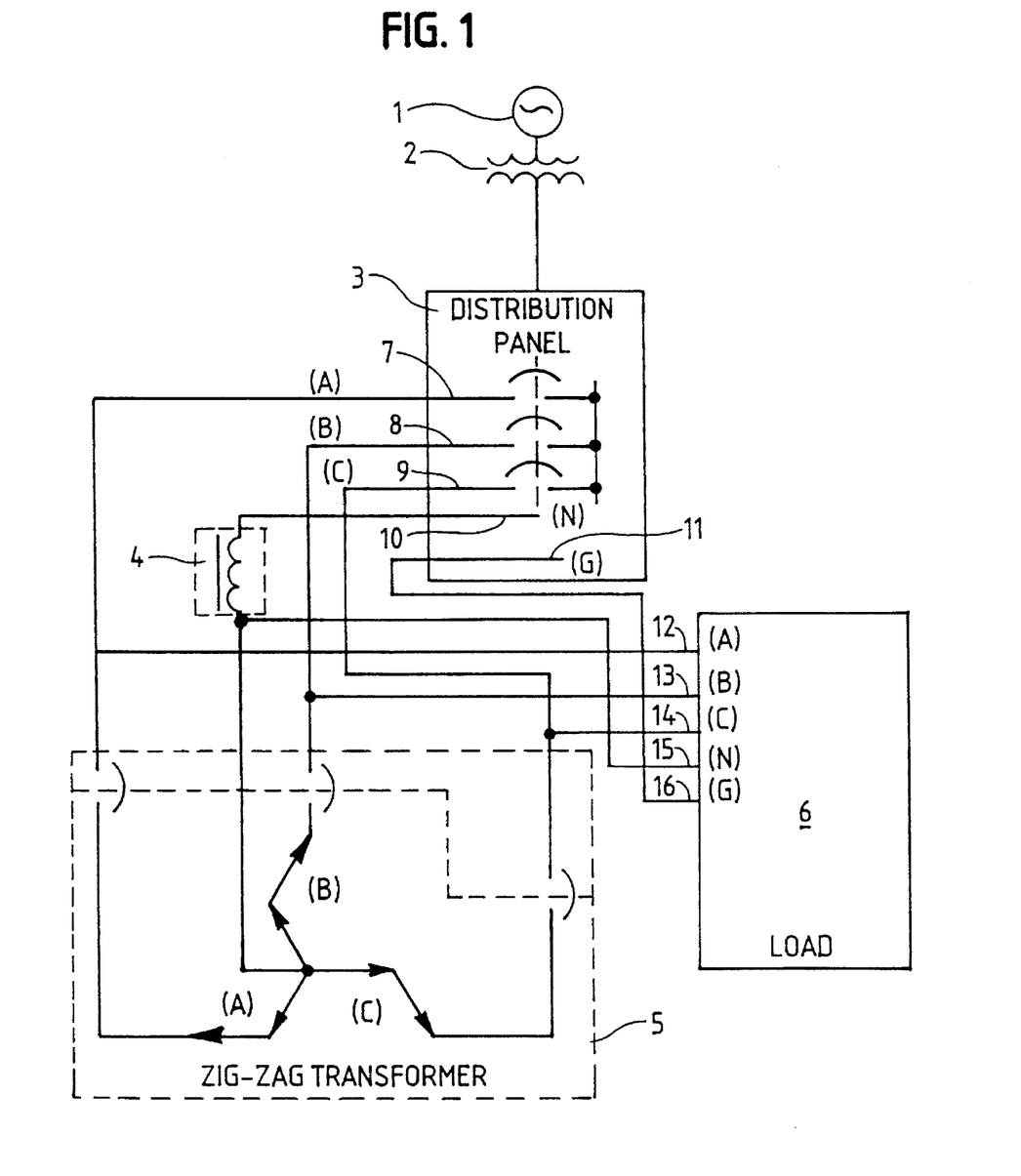
FIG. 1 is a circuit diagram of one embodiment of the present invention as connected with a representative AC source and a representative non-linear load.
Figure 2:
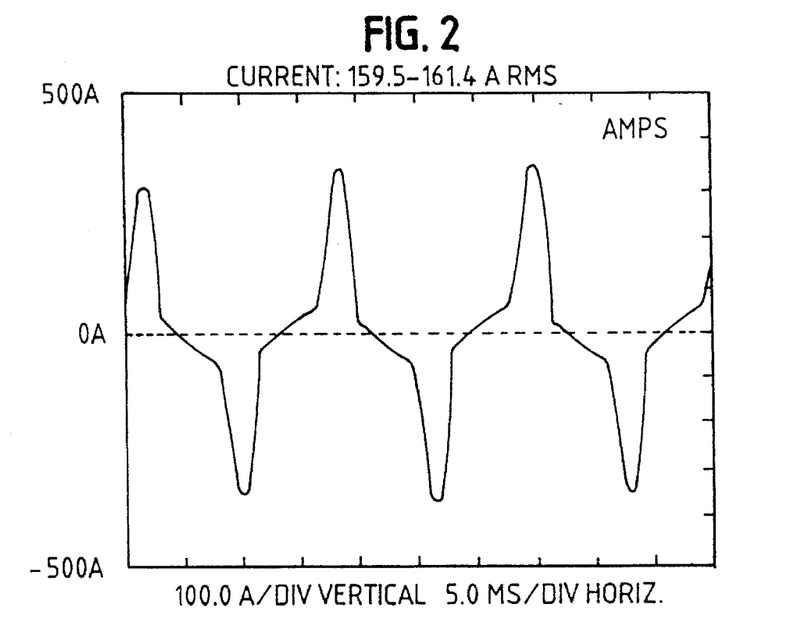
FIG. 2 is a plot of the Phase A current in the distribution panel board without a Zig-Zag transformer and without a choke.
Figure 3:
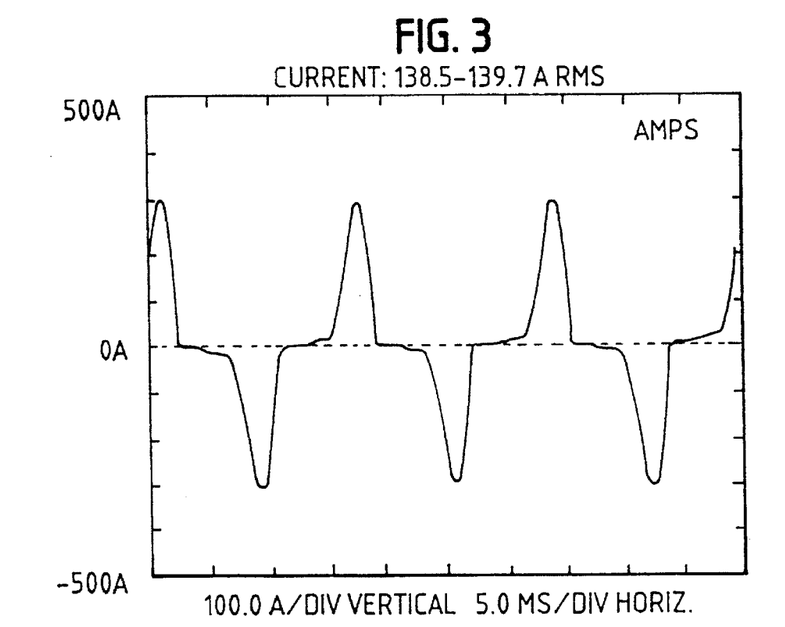
FIG. 3 is a plot of the Phase B current in the distribution panel board without a Zig-Zag transformer and without a choke.
Figure 4:
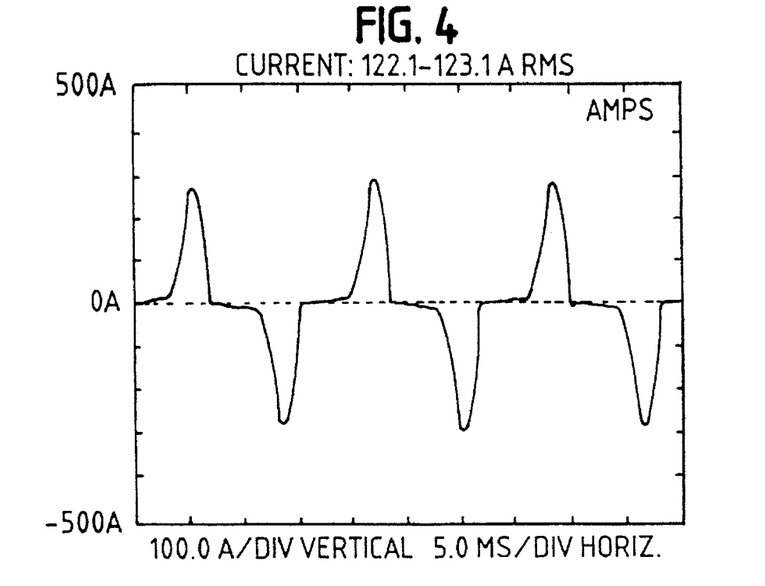
FIG. 4 is a plot of the Phase C current in the distribution panel board without a Zig-Zag transformer and without a choke.
Figure 5:
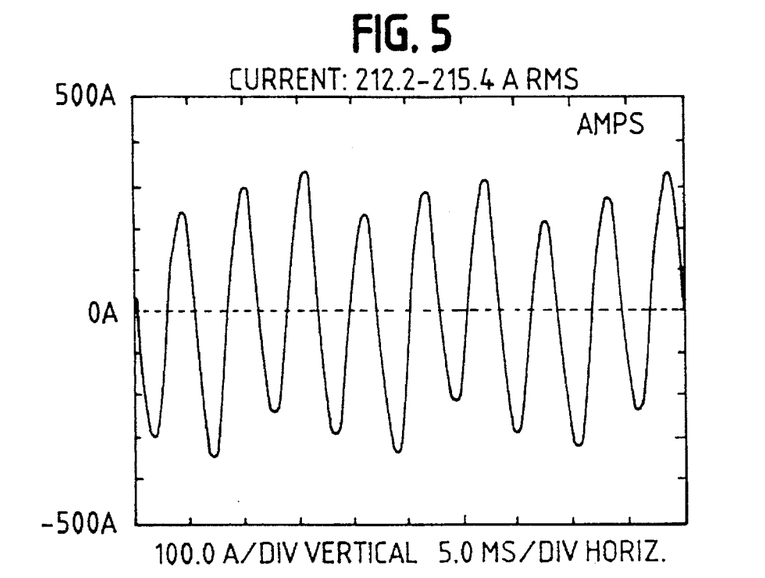
FIG. 5 is a plot of the Neutral current in the distribution panel board without a Zig-Zag transformer and without a choke.
Figure 6:
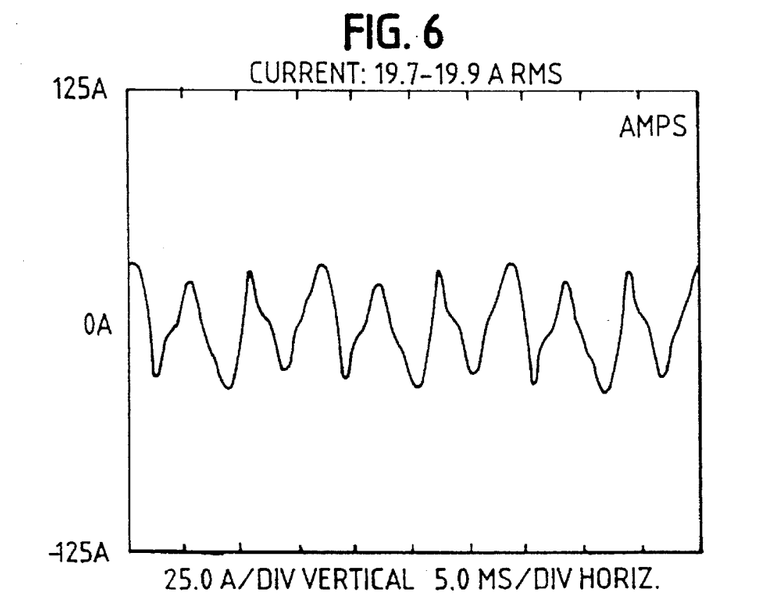
FIG. 6 is a plot of the neutral current (in the AC line) for a representative network without the choke installed on the Zig-Zag transformer neutral line.
Figure 7:
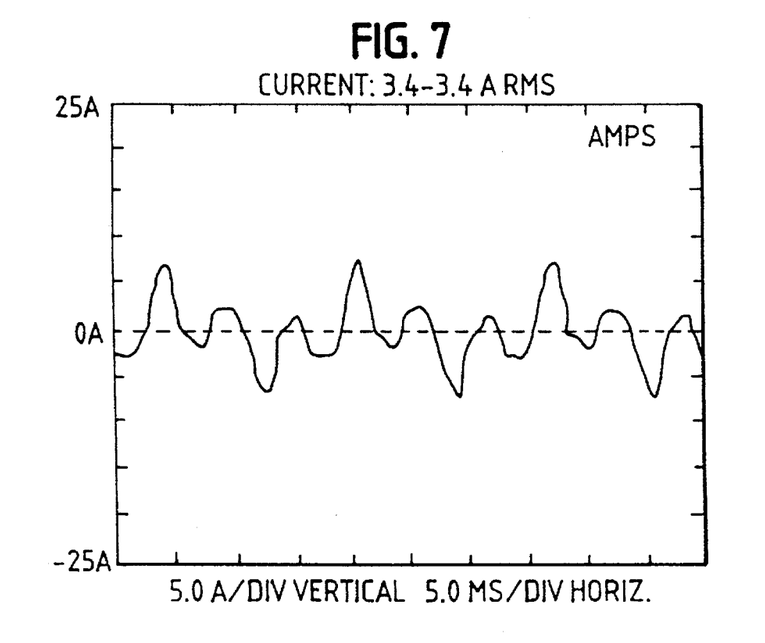
FIG. 7 is a plot of the neutral current (in the AC line) for a representative network with the choke installed on the Zig-Zag transformer neutral line.
Figure 8:
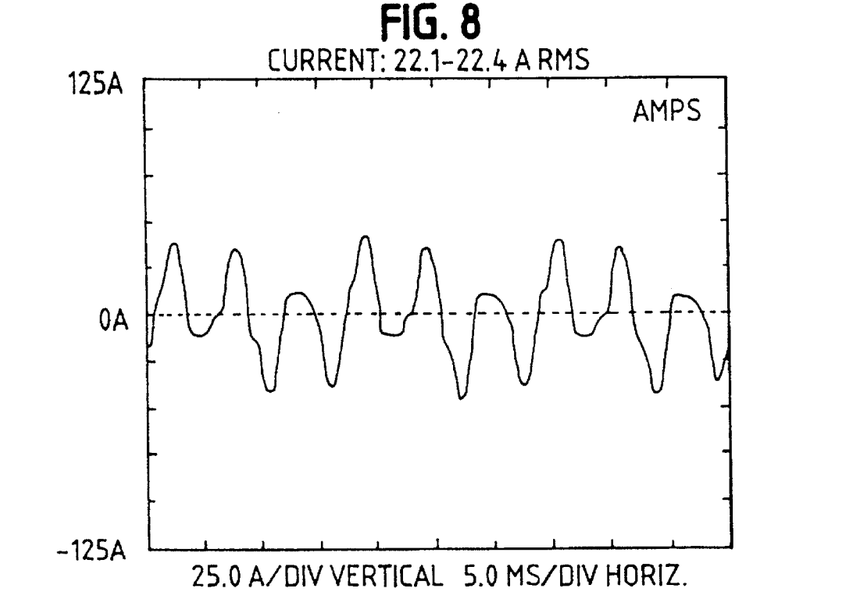
FIG. 8 is a plot of the neutral current (in the load) for a representative network without the choke installed on the Zig-Zag transformer neutral line.
Figure 9:
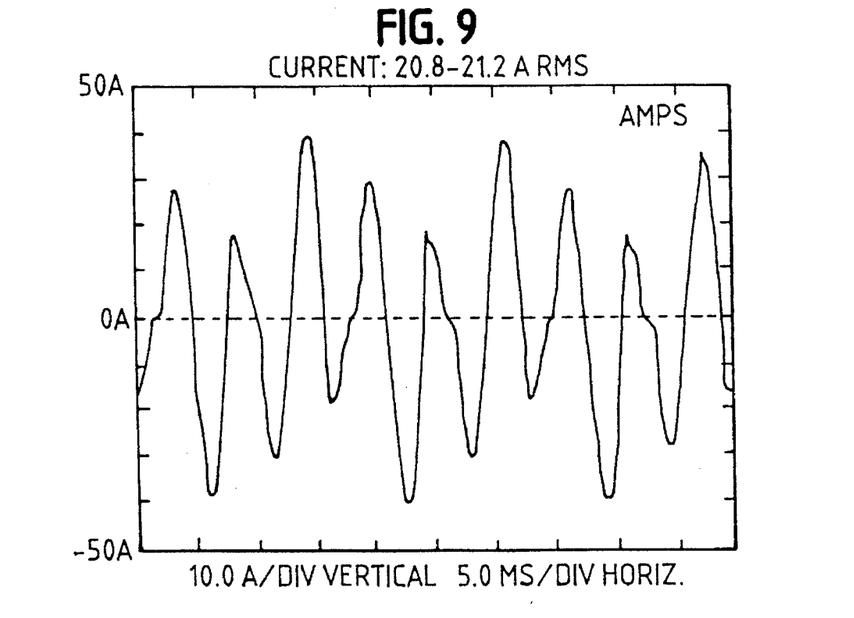
FIG. 9 is a plot of the neutral current (in the load) for a representative network with the choke installed on the Zig-Zag transformer neutral line.
Figure 10:
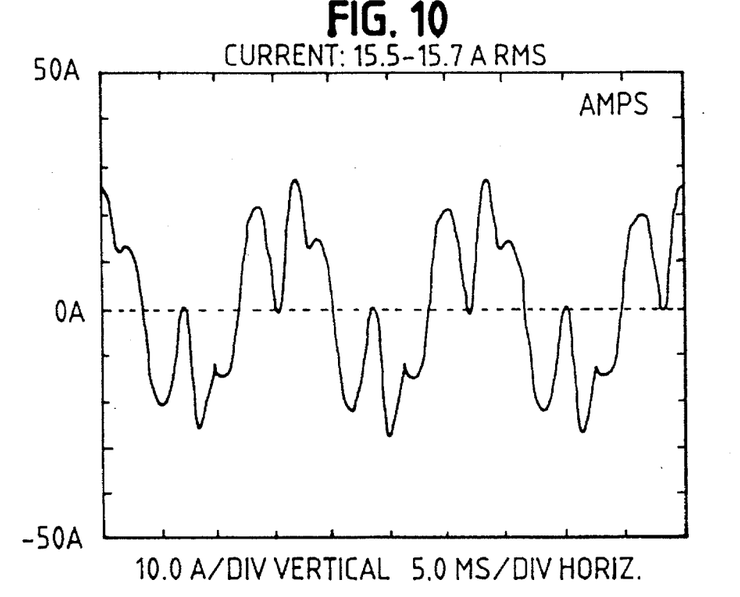
FIG. 10 is a plot of the Phase A current (in the AC line) for a representative network without the choke installed on the Zig-Zag transformer neutral line.
Figure 11:
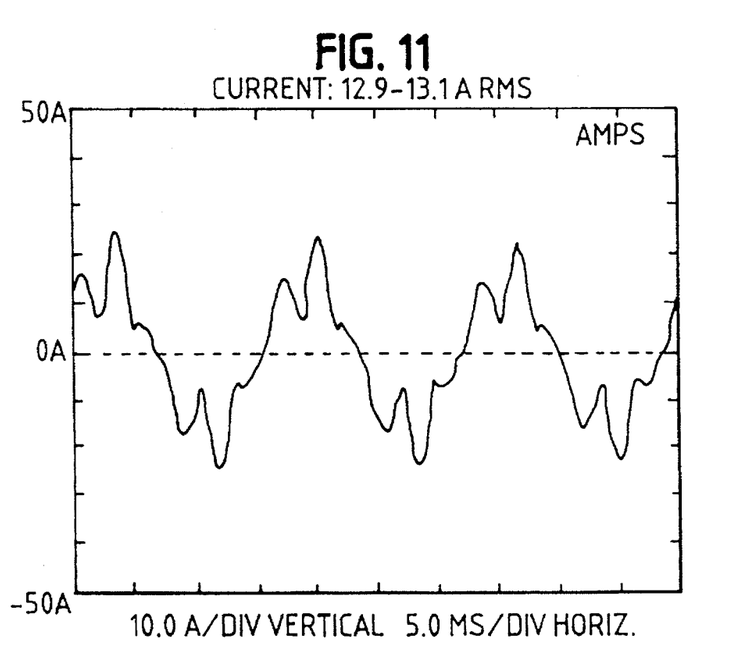
FIG. 11 is a plot of the Phase A current (In the AC line) for a representative network with the choke installed on the Zig-Zag transformer neutral line.
Figure 12:
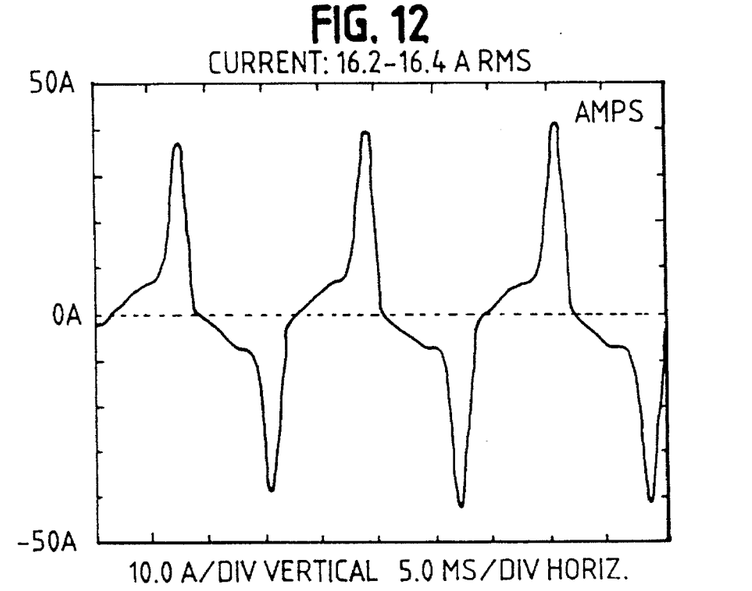
FIG. 12 is a plot of the Phase A current (in the load) for a representative network without the choke installed on the Zig-Zag transformer neutral line.
Figure 13:
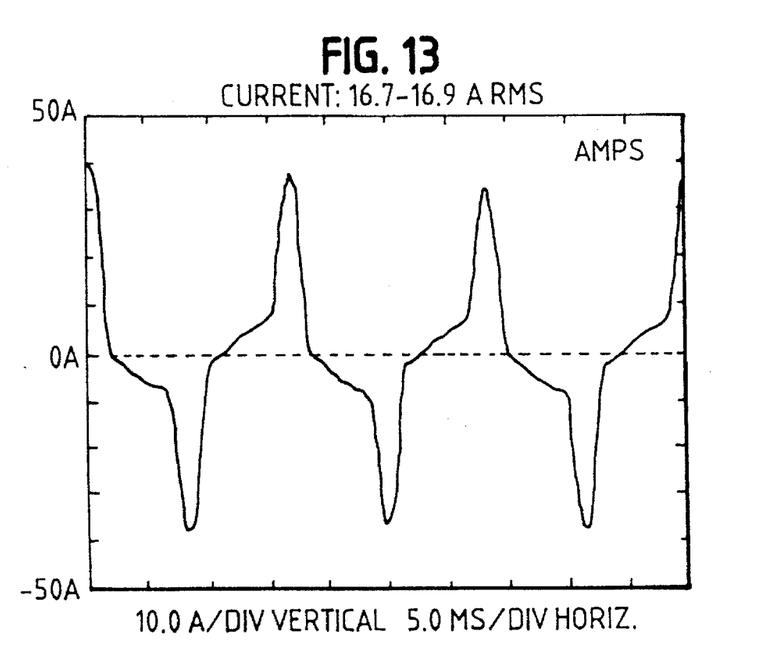
FIG. 13 is a plot of the Phase A current (in the load) for a representative network with the choke installed on the Zig-Zag transformer neutral line.
Figure 14:
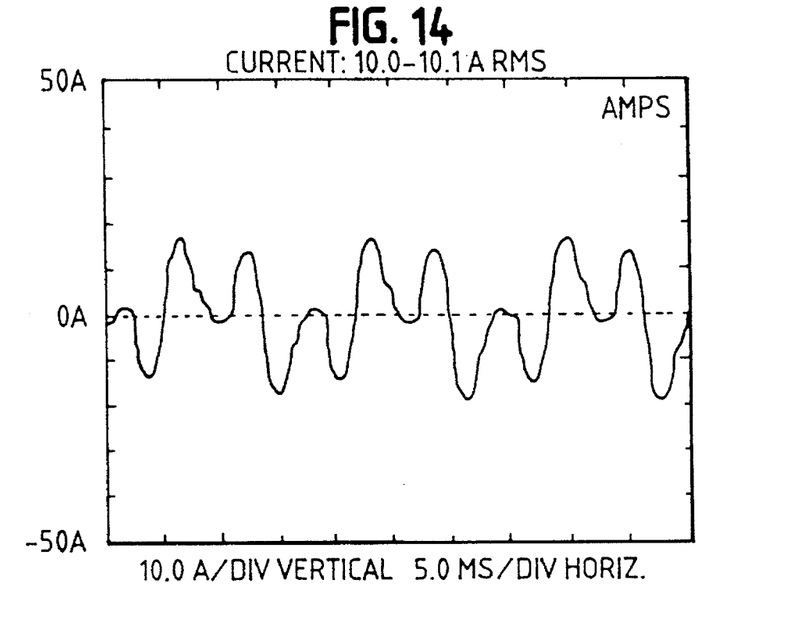
FIG. 14 is a plot of the Phase B current (in the AC line) for a representative network without the choke installed on the Zig-Zag transformer neutral line.
Figure 15:
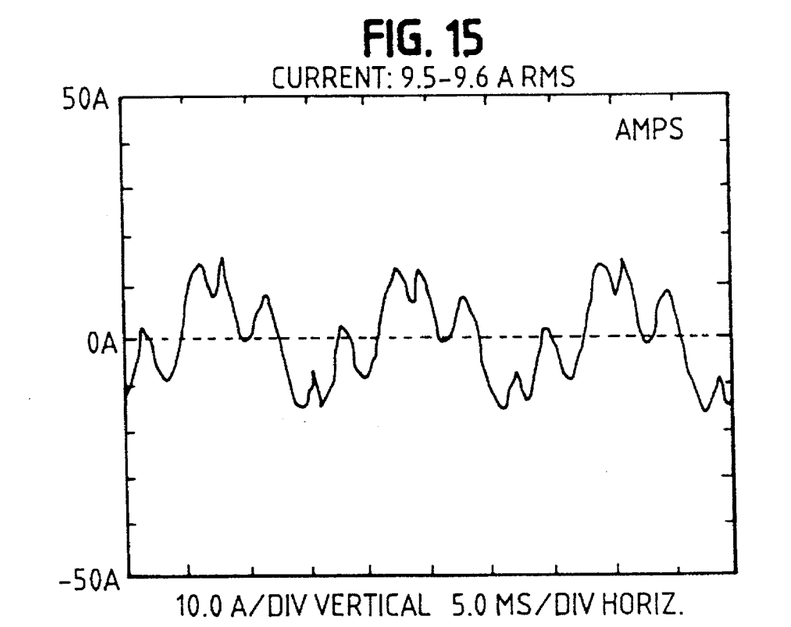
FIG. 15 is a plot of the Phase B current (in the AC line) for a representative network with the choke installed on the Zig-Zag transformer neutral line.
Figure 16:
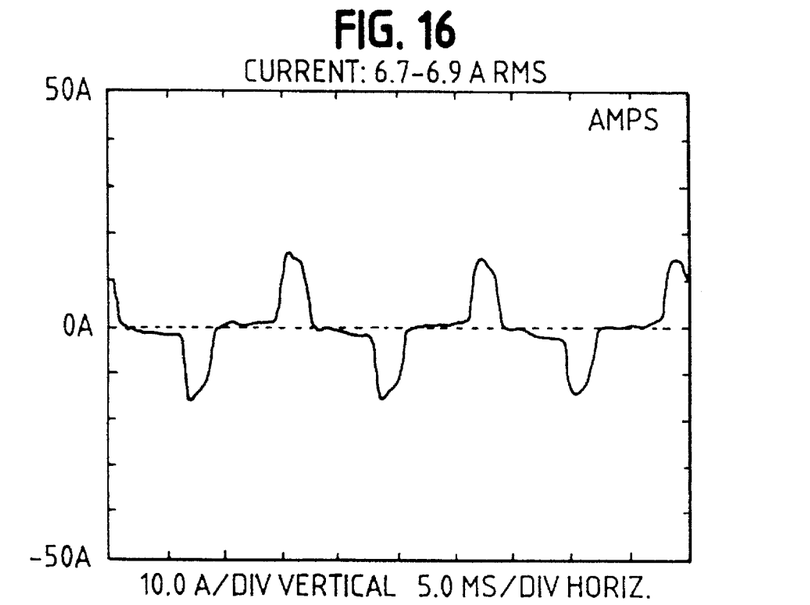
FIG. 16 is a plot of the Phase B current (in the load) for a representative network without the choke installed on the Zig-Zag transformer neutral line.
Figure 17:
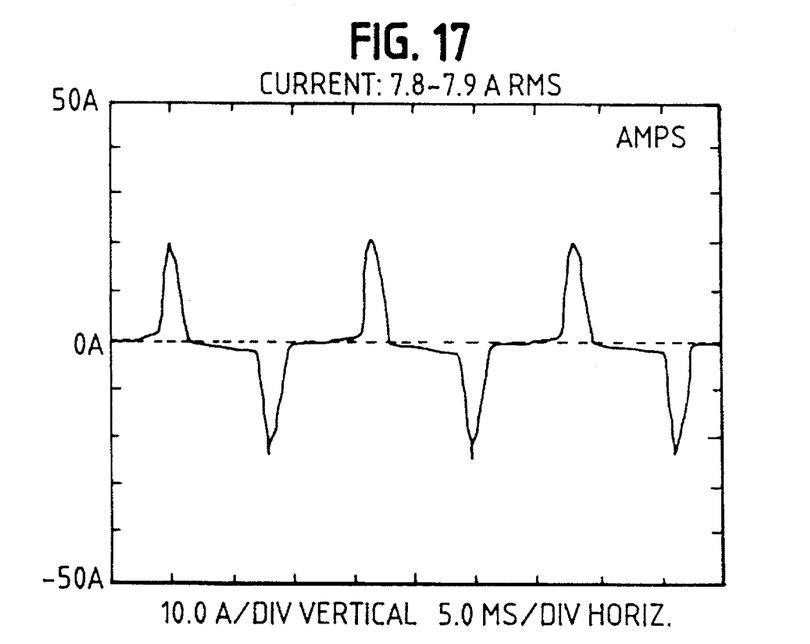
FIG. 17 is a plot of the Phase B current (in the load) for a representative network with the choke installed on the Zig-Zag transformer neutral line.
Figure 18:
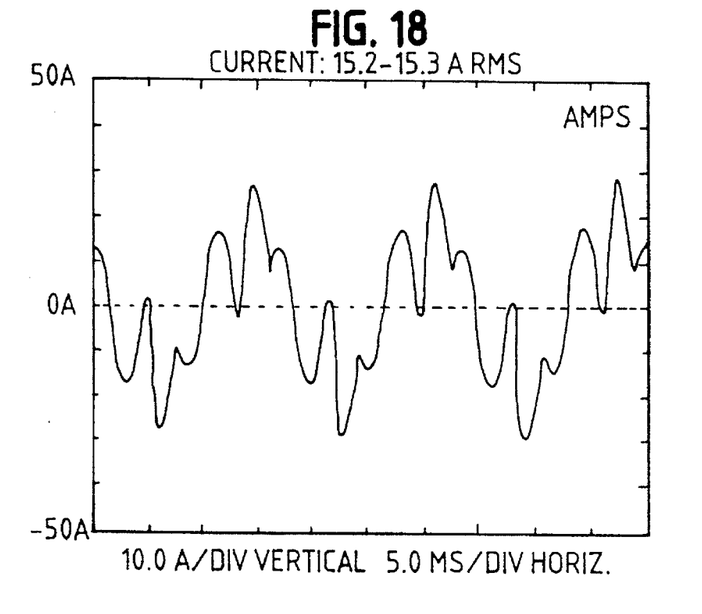
FIG. 18 is a plot of the Phase C current (in the AC line) for a representative network without the choke installed on the Zig-Zag transformer neutral line.
Figure 19:
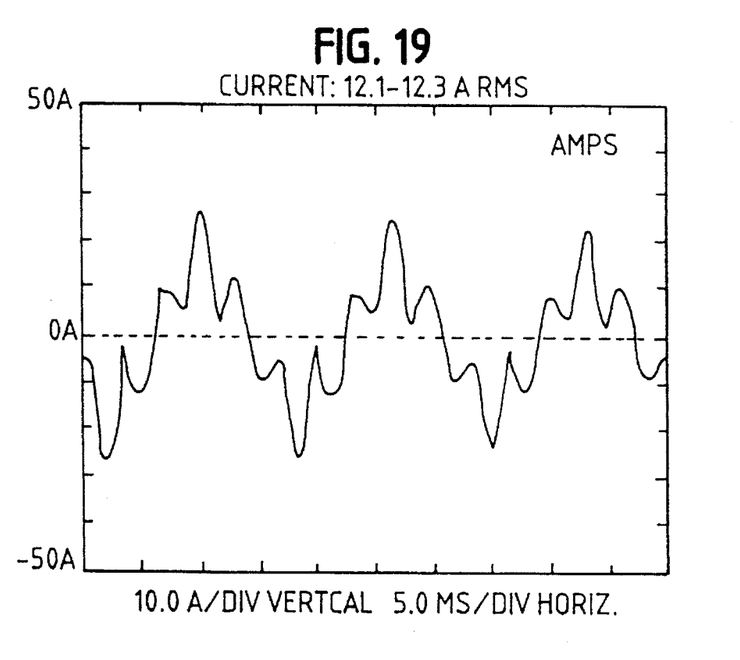
FIG. 19 is a plot of the Phase C current (in the AC line) for a representative network with the choke installed on the Zig-Zag transformer neutral line.
Figure 20:
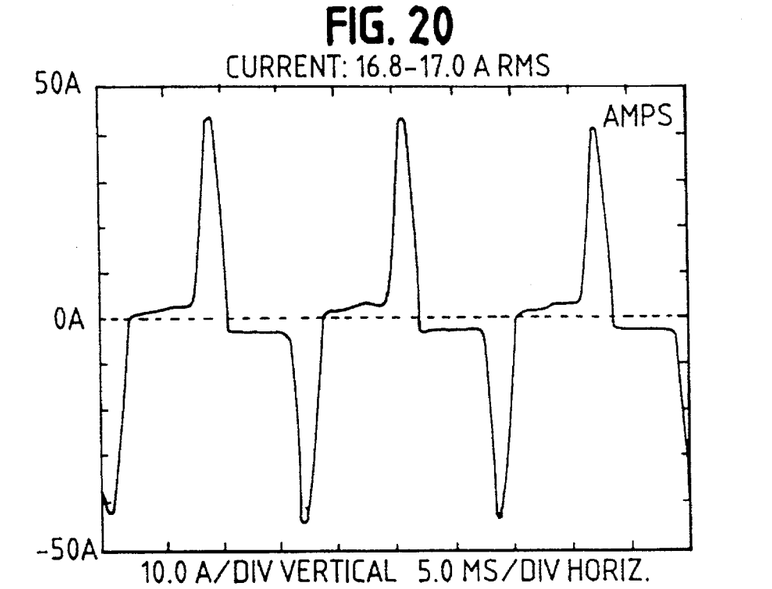
FIG. 20 is a plot of the Phase C current (in the load) for a representative network without the choke installed on the Zig-Zag transformer neutral line.
Figure 21:
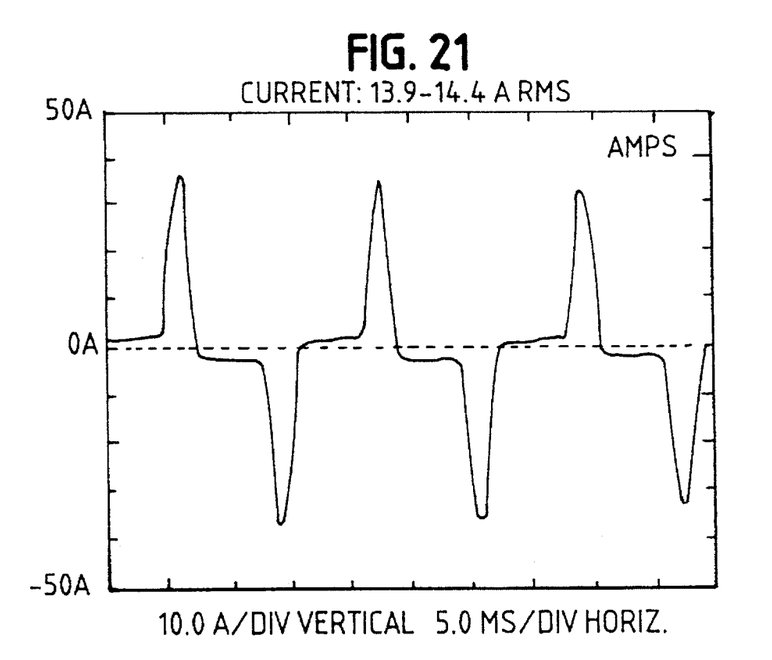
FIG. 21 is a plot of the Phase C current (in the load) for a representative network with the choke installed on the Zig-Zag transformer neutral line.

FIG. 1 shows a circuit diagram, with blocked elements, which includes a Zig-Zag transformer 5, a load 6, a choke 4, an AC power source 1, a distribution panel board 3, and a distribution transformer 2. FIG. 1 depicts the installation of the Zig-Zag transformer 5 with a choke 4. The choke 4 is installed in the neutral line 10 between the AC distribution transformer 2 and the Zig-Zag transformer 5. The load 6 is typically non-linear in character.

The preferred embodiment was tested as follows: A testing site, which was plagued by harmonics, included an AC power source 1 feeding a 150 KVA (480-208/120V) distribution transformer 2. The non-linear load 6 included a plurality of 5 VDC and 15 VDC switch mode power supplies connected to the 120 VAC, 3 phase, 60 HZ AC distribution line. Harmonics in the network were causing, among other things, overheating in the distribution transformer, as well as overheating in the secondary distribution wires.

FIGS. 2, 3, 4, and 5 show the phase and neutral root-mean-squared (RMS) currents as measured at the distribution panel board 3, as well as the total harmonic distortion (THD) percentage for each current. All three phase currents were balanced to within only 20%. The prevailing harmonic in each current was the third harmonic with the neutral current carrying an almost pure third harmonic component. The results are as follows:

TABLE 1

| FIG. | Current | A RMS | THD % | 3rd Harm. % |
|---|---|---|---|---|
| 2 | Ph. A | 160.5 | 58.4 | 51.8 |
| 3 | Ph. B | 139.1 | 67.8 | 61.5 |
| 4 | Ph. C | 122.6 | 73.4 | 65.5 |
| 5 | Neutral | 213.8 | 544.3 | 552.8 |

To reduce the neutral current and the THD's associated with each current, a Zig-Zag transformer 5 with, for example, an E-shaped laminated core and conventional cylindrical coils, was selected with a current rating of 15 A per phase as sufficient for this test load. The transformer 5 was connected in parallel with the load 6, but without the choke 4 in the neutral line. Measurements for each current (neutral, phase A, phase B, and phase C) were taken in the AC lines 7, 8, 9, and 10 (FIG. 1—shown before the Zig-Zag transformer) and in the load lines 12, 13, 14, and 15 (FIG. 1—shown after the Zig-Zag transformer). As shown in FIGS. 6, 8, 10, 12, 14, 16, 18, and 20, the results are as follows:

TABLE 2

| FIG. | Current | A RMS | THD % |
|---|---|---|---|
| 6 | Neutral in line | 19.8 | 266.3 |
| 8 | Neutral in load | 22.2 | 280.9 |
| 10 | Ph. A in line | 15.6 | 66.5 |
| 12 | Ph. A in load | 16.3 | 69.2 |
| 14 | Ph. B in line | 10.1 | 145.5 |
| 16 | Ph. B in load | 6.8 | 76.9 |
| 18 | Ph. C in line | 15.3 | 63.9 |
| 20 | Ph. C in load | 16.9 | 93.3 |

With certain loads included in a distribution network, the Zig-Zag transformer does not provide a sufficient reduction in THD, nor are the phase currents sufficiently balanced. This is caused by the relatively high Zig-Zag transformer impedance as compared to the AC source impedance.

To determine this, the following analysis was performed: Measurements and the manufacturer's data showed that the Zig-Zag transformer's resistance was about 0.12 Ohm per winding or 0.24 Ohm per phase. A shorted secondary test was performed on the Zig-Zag transformer which gave a transformer impedance of Z=0.3 Ohm. From this, the transformer reactance was calculated for 60 Hz at $X_{60}=0.186$ Ohm. The third harmonic current (180 Hz) reactance of the transformer was calculated at $X_{180}=3 \cdot X_{60}=0.558$ Ohm and the transformer impedance for the third harmonic was calculated at $Z_{180}=0.61$ Ohm.

Upon disconnecting the neutral wire between the neutral point of the transformer and the AC line, a sinusoidal 180 Hz voltage with 11 V peak to peak value was measured between the transformer neutral and ground. This resulted in an RMS voltage of 3.9 V applied to each transformer leg. At the same time the load neutral current RMS was 18 A. From this a combined phase impedance of Zig-Zag transformer and the AC line was calculated at 0.65 Ohm and the AC line impedance of 0.04 Ohm.

Figure 22:
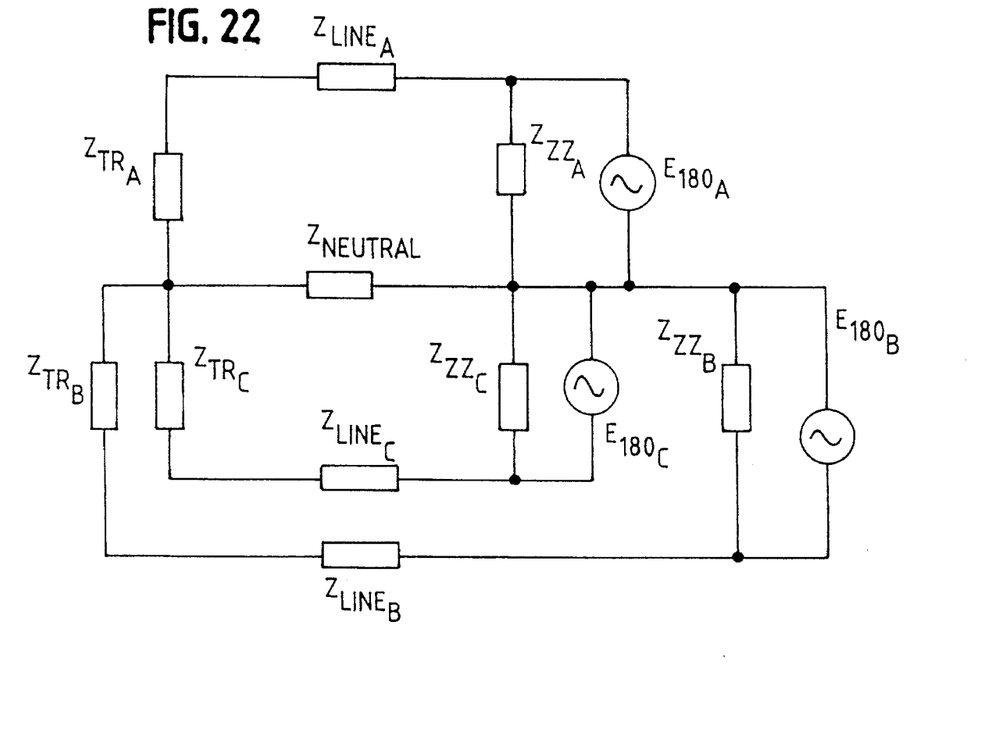
FIG. 22 is an equivalent schematic diagram of the distribution system, load, and Zig-Zag transformer for the third harmonic current.
Figure 23:
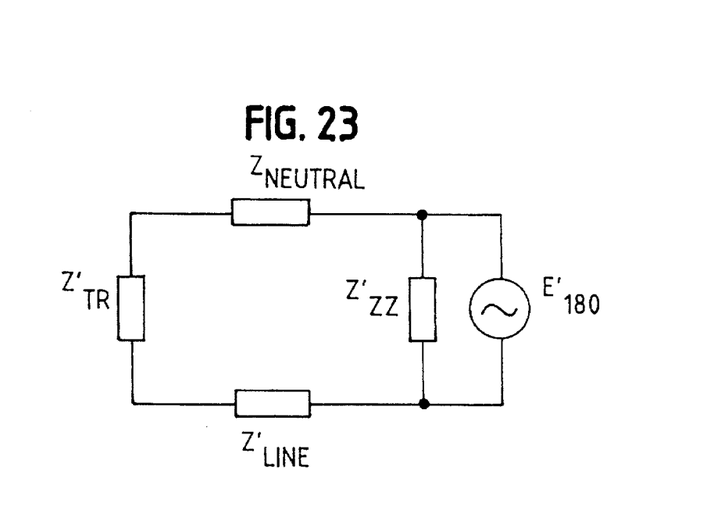
FIG. 23 is a reduced equivalent schematic diagram of the distribution system, load, and Zig-Zag transformer for the third harmonic current.

FIG. 22 shows the equivalent schematic for the third harmonic currents with the nonlinear load represented as the third harmonic voltage source. Each phase is represented as a combination of three impedances: Zig-Zag transformer ($Z_{zz}$), line ($Z_{line}$) and distribution transformer ($Z_{tr}$). The load is represented by three third harmonic voltage sources ($E_{180}$). Third harmonic voltages in all phases are in phase and we can substitute three voltage sources by the single source and derive the schematic in FIG. 23. Because all three phases are symmetrical: $Z'_{tr}=Z_{tr}/3$; $Z'_{zz}=Z_{zz}/3$; $Z'_{line}=Z_{line}/3$; $E'_{180}=E_{180}/3$.

To calculate the value of the neutral wire impedance, the voltage between the transformer neutral point and the ground was measured with the neutral wire in place. The voltage was 1.1 V peak to peak. The neutral current RMS was 11.5 A. Similar to the previous calculations, a source neutral impedance value of 0.1 Ohm was determined.

From these calculations, it becomes apparent that the impedance of the source neutral should be increased to make it harder for the neutral current to return via the distribution transformer. Moreover, the neutral impedance of the AC distribution system for third harmonic currents should be increased so that it is about an order of magnitude larger than the Zig-Zag transformer impedance. This will force most of the third harmonic currents produced by the load to flow through the Zig-Zag transformer and be eliminated or reduced.

Merely disconnecting the source neutral is not acceptable for safety reasons. Hence, a choke was installed in the neutral line between the AC source and the Zig-Zag transformer in order to increase the AC line impedance for the neutral current. For the test setup described, a choke with an inductance value of 1 mH was selected which gave an impedance of 1.13 Ohm for the third harmonic currents.

The test results, with both the Zig-Zag transformer and the choke in place, are shown in FIGS. 7, 9, 11, 13, 15, 17, 19, and 21, and are as follows:

TABLE 3

| FIG. | Current | A RMS | THD % |
| --- | --- | --- | --- |
| 7 | Neutral in line | 3.4 | 168.3 |
| 9 | Neutral in load | 21.0 | 269.1 |
| 11 | Ph. A in line | 13.0 | 35.5 |
| 13 | Ph. A in load | 16.8 | 65.0 |
| 15 | Ph. B in line | 9.6 | 70.3 |
| 17 | Ph. B in load | 7.9 | 98.8 |
| 19 | Ph. C in line | 12.2 | 49.5 |
| 21 | Ph. C in load | 14.2 | 90.3 |

The combination of the Zig-Zag transformer and the 1 mH choke in the neutral produced much better results for the loads tested. In this example, the neutral current dropped more than a factor of six, the third harmonic current was almost eliminated from the phase currents, and the overall current balance was improved. See Tables 4, 5, and 6 below:

TABLE 4

| Current | A RMS (no choke) | A RMS (with choke) |
| --- | --- | --- |
| Neutral in line | 19.8 | 3.4 |
| Neutral in load | 22.2 | 21.0 |
| Ph. A in line | 15.6 | 13.0 |
| Ph. A in load | 16.3 | 16.8 |
| Ph. B in line | 10.1 | 9.6 |
| Ph. B in load | 6.8 | 7.9 |
| Ph. C in line | 15.3 | 12.2 |
| Ph. C in load | 16.9 | 14.2 |

TABLE 5

| Current | THD % (no choke) | THD % (with choke) |
| --- | --- | --- |
| Neutral in line | 266.3 | 168.3 |
| Neutral in load | 280.9 | 269.1 |
| Ph. A in line | 66.5 | 35.5 |
| Ph. A in load | 69.2 | 65.0 |
| Ph. B in line | 145.5 | 70.3 |
| Ph. B in load | 76.9 | 98.8 |
| Ph. C in line | 63.9 | 49.5 |
| Ph. C in load | 93.3 | 90.3 |

TABLE 6

| Current | 3rd Harm. % (no choke) | 3rd Harm. % (with choke) |
| --- | --- | --- |
| Neutral in line | 252.7 | 162.8 |
| Neutral in load | 270.7 | 262.1 |
| Ph. A in line | 51.0 | 9.4 |
| Ph. A in load | 55.6 | 55.0 |
| Ph. B in line | 141.3 | 55.5 |
| Ph. B in load | 66.9 | 75.0 |
| Ph. C in line | 36.1 | 8.0 |
| Ph. C in load | 76.7 | 75.8 |

Moreover, the results achieved with the choke in place are consistently better for different types of loads, and for a plurality of loads attached to the same network. Different loads, at different points in the network, can induce undesirably high no-load currents in the Zig-Zag transformer. Testing has revealed that third harmonic currents from loads often combine with other third harmonic currents that are attracted from yet other loads in the network. Hence, the ability of the Zig-Zag transformer to eliminate harmonics and balance the fundamental currents is adversely affected.

Adding a choke in the neutral, i.e. introducing a larger impedance for the neutral currents, helps to eliminate the contribution from other loads to a large degree. In this instance, the choke reduced the transformer no-load current from 10.8 A to 1.7 A. Hence, the Zig-Zag transformer and choke combination produces more consistent results, with a wider variety of loads, than the Zig-Zag transformer alone.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An apparatus for reducing the harmonic content of AC phase and neutral line currents between a load and a polyphase AC source distribution network, said apparatus comprising:

a polyphase Zig-Zag autotransformer having input and output current lines, an input neutral line and an output neutral line, said input current lines and input neutral line being connected to said AC source distribution network, said output current lines and output neutral line being connected to said load; and a choke connected within said input neutral line between said AC source distribution network and said Zig-Zag autotransformer.

2. An apparatus for reducing the harmonic content of AC phase and neutral line currents between a load and a polyphase AC source distribution network, said apparatus comprising:

a polyphase Zig-Zag autotransformer having input and output current lines, an input neutral line and an output neutral line, said input current lines and input neutral line being connected to said AC source distribution network, said output current lines and output neutral line being connected to said load; and means for increasing the source neutral impedance on said input neutral line experienced by said AC source distribution network relative to said Zig-Zag autotransformer connected in parallel with said load.

3. A method for reducing the harmonic content of AC phase and neutral line currents between a load and a polyphase AC source distribution network comprising the steps of:

providing polyphase Zig-Zag autotransformer having input and output current lines, an input neutral line and an output neutral line;

connecting said input current lines and input neutral line to said AC source distribution network;

connecting said output current lines and output neutral line to said load; and connecting a choke within said input neutral line between said AC source distribution network and said Zig-Zag autotransformer.

4. A method for reducing the harmonic content of AC phase and neutral line currents between a load and a polyphase AC source distribution network comprising the steps of:

providing a polyphase Zig-Zag autotransformer having input and output current lines, an input neutral line and an output neutral line;

connecting said input current lines and input neutral line to said AC source distribution network;

connecting said output current lines and output neutral line to said load; and increasing the source neutral impedance on said input neutral line experienced by said AC source distribution network relative to said Zig-Zag autotransformer connected in parallel with said load.

* * * * *